United States Patent
Bonicel et al.

(10) Patent No.: US 6,941,050 B2
(45) Date of Patent: Sep. 6, 2005

(54) ELECTRICAL INSULATOR HAVING A DIELECTRIC ROD WITH A SLOT FOR RECEIVING AN OPTICAL FIBER CABLE

(75) Inventors: Jean-Pierre Bonicel, Rueil Malmaison (FR); Renaud Le Gac, Asnieres (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/784,238

(22) Filed: Feb. 24, 2004

(65) Prior Publication Data

US 2004/0165843 A1 Aug. 26, 2004

(30) Foreign Application Priority Data

Feb. 25, 2003 (FR) .......................................... 03 02263

(51) Int. Cl.$^7$ ................................................. G02B 6/44
(52) U.S. Cl. ........................ 385/103; 385/105; 174/179
(58) Field of Search ................................ 385/103, 105; 174/179, 139

(56) References Cited

U.S. PATENT DOCUMENTS

| | | | |
|---|---|---|---|
| 3,485,940 A | * 12/1969 | Frey et al. ................... | 174/139 |
| 4,212,696 A | * 7/1980 | Lusk et al. ................... | 156/294 |
| 4,422,178 A | 12/1983 | Nakagome et al. | |
| 4,610,033 A | * 9/1986 | Fox, Jr. ....................... | 398/141 |
| 4,802,731 A | 2/1989 | Maschek et al. | |
| 5,204,926 A | * 4/1993 | Bottoms et al. ............. | 385/105 |
| 5,224,190 A | * 6/1993 | Chu et al. .................... | 385/107 |
| 5,637,827 A | * 6/1997 | Goch ........................... | 174/30 |
| 5,761,361 A | * 6/1998 | Pfandl et al. ................ | 385/100 |
| 6,035,087 A | * 3/2000 | Bonicel et al. .............. | 385/109 |
| 6,284,082 B1 | 9/2001 | Schuler et al. | |
| 6,507,692 B1 | * 1/2003 | Hoefner et al. ............. | 385/136 |
| 6,654,525 B2 | * 11/2003 | Nechitailo et al. .......... | 385/103 |

FOREIGN PATENT DOCUMENTS

| | | |
|---|---|---|
| EP | 0 146 845 A2 | 7/1985 |
| EP | 0 433 565 A2 | 6/1991 |
| JP | 6-162845 A | 6/1994 |
| JP | 10-162668 A | 6/1998 |

* cited by examiner

*Primary Examiner*—Hae Moon Hyeon
(74) *Attorney, Agent, or Firm*—Sughrue Mion, PLLC

(57) ABSTRACT

The invention relates to the field of electrical insulators, and in particular to the field of electrical insulators for optical phase conductors (OPPCs). The electrical insulator comprises a dielectric rod (1) having at least one slot (10), a flexible optical fiber cable (2) situated in the slot (10), a dielectric material (8) filling the slot (10) and holding the cable (2) in the slot (10) without stressing it, and a dielectric covering (3) surrounding the rod (1) and presenting outwardly-directed projections (30) in the form of skirts, the entire space situated between the rod (1) and the cable (2) being filled with said dielectric filler and holding material (8).

15 Claims, 3 Drawing Sheets

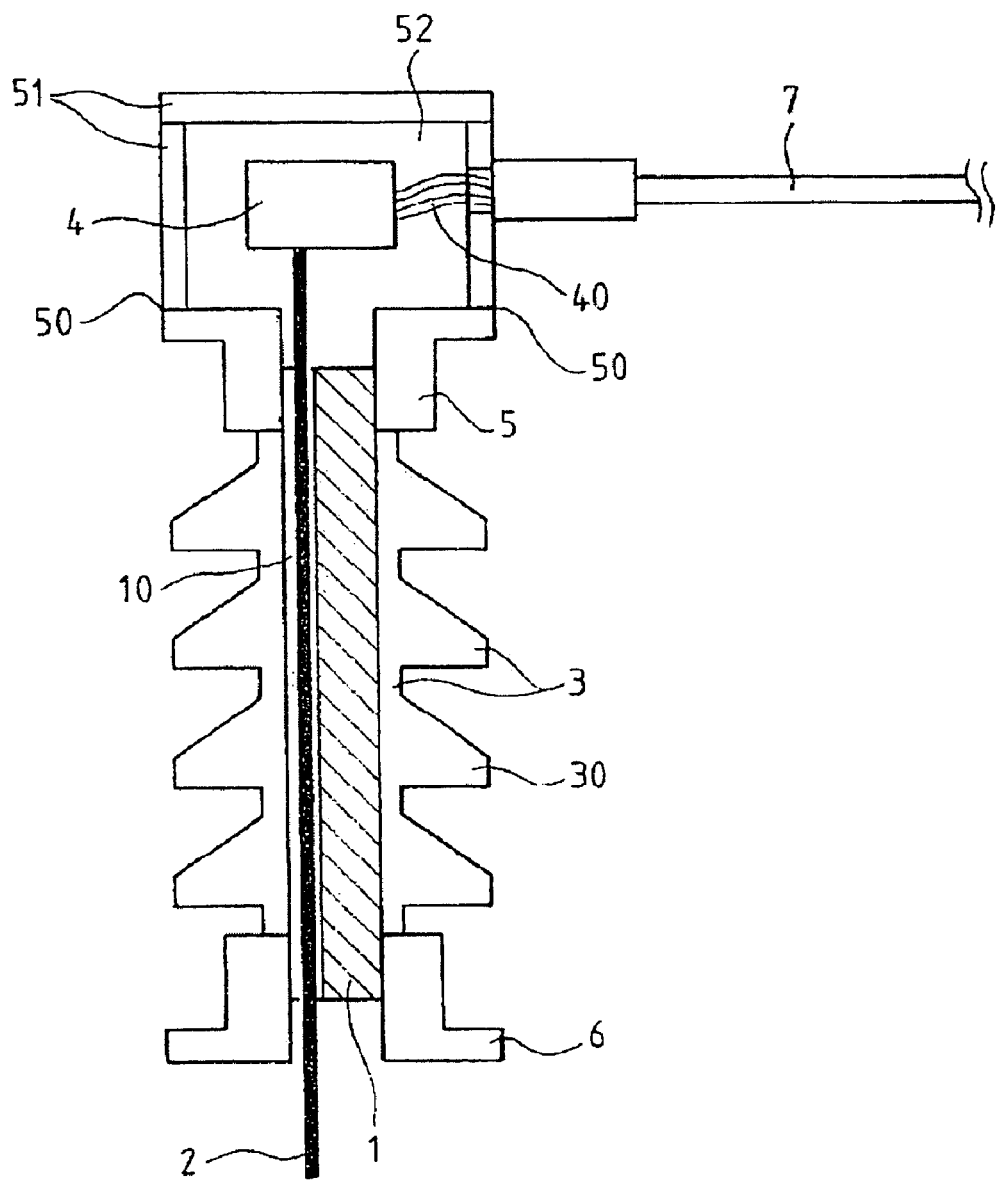
FIG_1

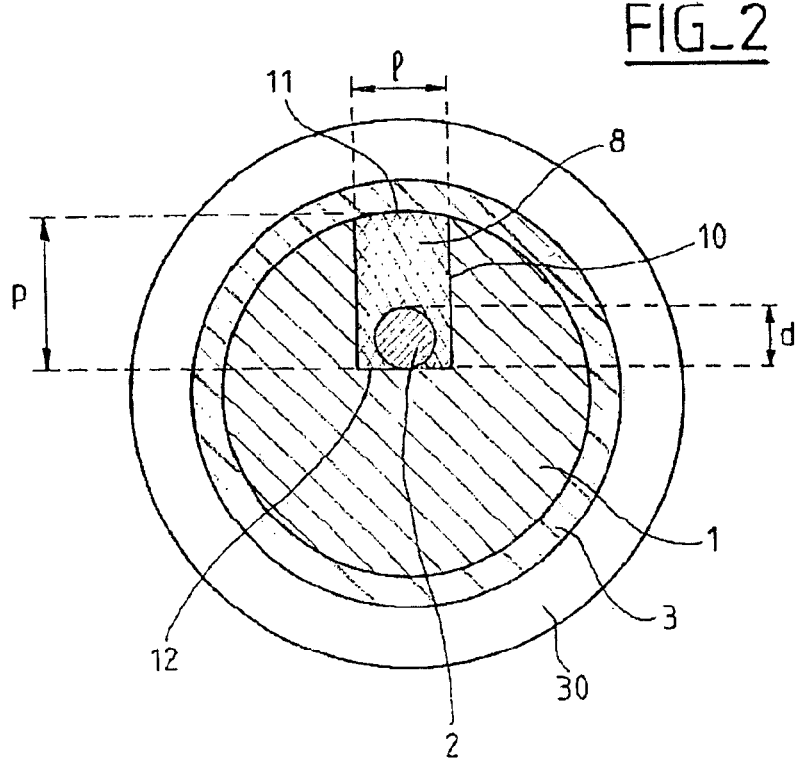
FIG_2
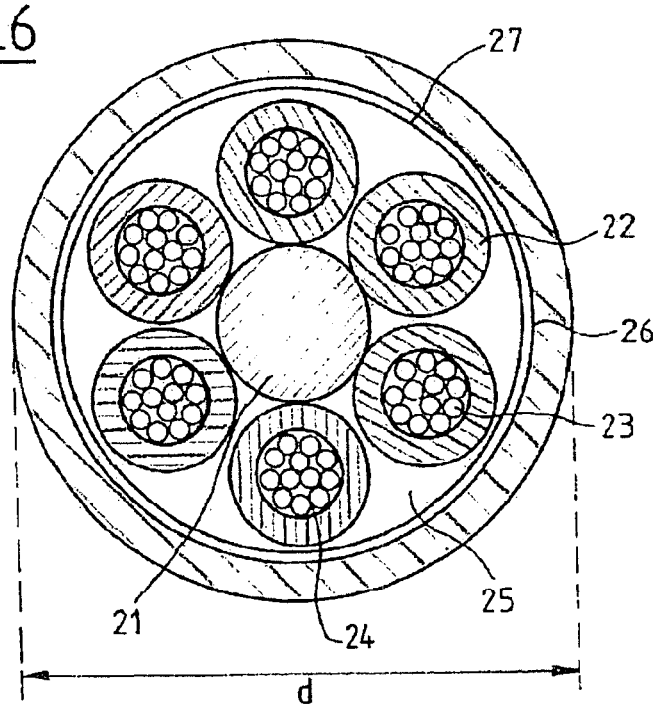
FIG_6

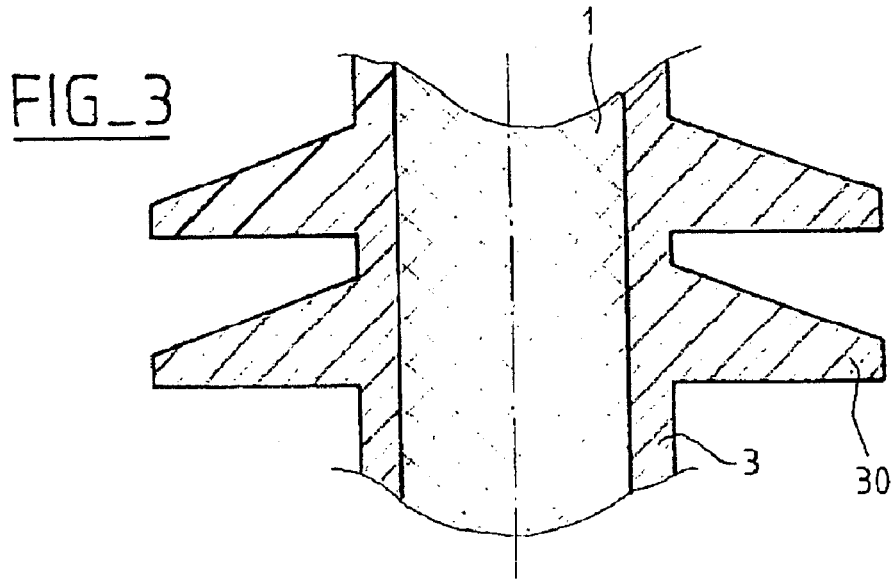
FIG_3
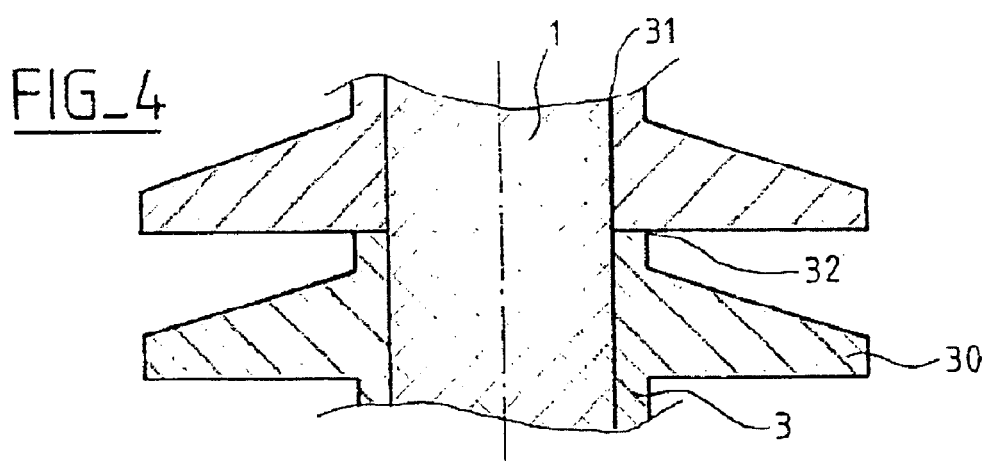
FIG_4
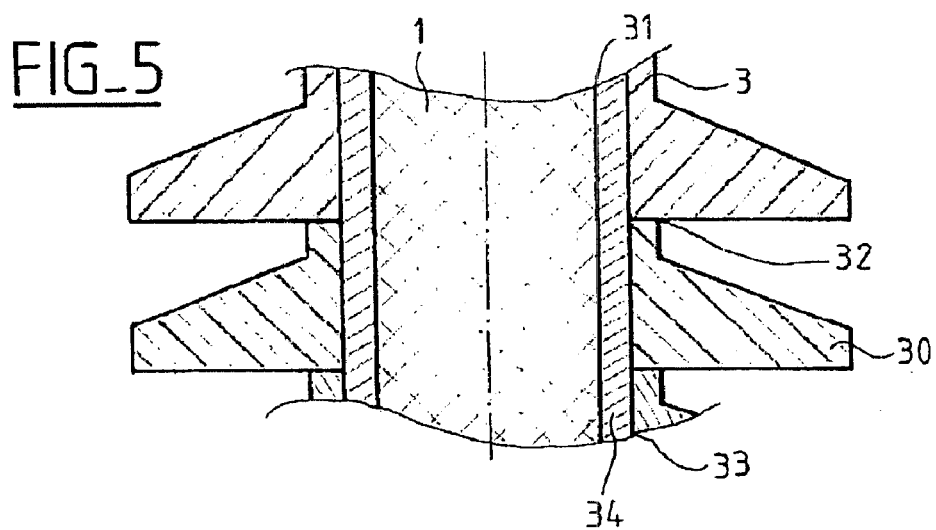
FIG_5

ELECTRICAL INSULATOR HAVING A DIELECTRIC ROD WITH A SLOT FOR RECEIVING AN OPTICAL FIBER CABLE

BACKGROUND OF THE INVENTION

The invention relates to the field of electrical insulators, and in particular to the field of electrical insulators for power cables known as optical phase conductors (OPPCs). The invention also relates to the field of systems associating an electrical insulator with at least one phase conductor. This type of electrical insulator serves to pass an optical signal from one end to the other of said electrical insulator while providing electrical insulation between the ends of said electrical insulator. This type of electrical insulator serves in particular to make an optical connection between the phase conductors of the overhead electricity network and the underground optical network. Because of the great voltage difference between the overhead electricity network and the underground optical network, electrical insulation needs to be particularly good and reliable. Electrical insulators are conventionally placed at the tops of pylons supporting phase conductors. The optical fibers contained in phase conductors are connected to the underground optical network via an optical cable referred to as a "optical microcable" connecting the phase conductor to the cable of the underground optical network. The interface between the optical microcable and the phase conductor takes place via a cassette for storing splices between optical fibers situated in the electrical insulator and the interface between the optical microcable and the cable of the underground optical network is implemented via an optical connection terminal.

From prior art described in U.S. Pat. No. 5,637,827 (see FIG. 7 and lines 1 to 40 in column 7), an electrical insulator is known constituted by a dielectric covering itself constituted by a stack of skirts or "sheds" stacked one on another and stuck to one another and onto a dielectric rod which they surround. The dielectric rod presents a slot in which there is received a plastics tube for protecting an optical fiber cable, a filler material filling the interstices between the tube and the rod, and also between the tube and the cable.

In order to achieve good electrical insulation while enabling high quality optical transmission, the electrical insulator of the invention must present a good compromise between the following two properties: firstly reliable electrical insulation between opposite ends of the electrical insulator in order to ensure good electrical insulation; and secondly high-quality protection of the optical fiber cable in order to ensure good-quality optical transmission. Unfortunately, those two properties can present requirements that are contradictory, a priori. Whereas reliable electrical insulation requires as few elements as possible within the electrical insulator and as few interfaces as possible between said elements, high-quality protection for an optical fiber cable would appear, on the contrary, to require additional protection elements. Both quality of electrical insulation and quality of optical fiber cable protection require good protection for the dielectric rod surrounding the optical fiber cable.

In the above-mentioned prior art, the optical fiber cable is properly protected, but the reliability of the electrical insulation provided by the electrical insulator is insufficient. In order to improve the compromise between the reliability of the electrical insulation provided by the electrical insulator and the quality of protection provided to the optical fiber cable, one of the innovations of the invention consists in omitting the tube for protecting the optical fiber cable. Several advantageous embodiments without said protective tube achieve better compromises than in the above-mentioned prior art.

SUMMARY OF THE INVENTION

In a first embodiment shown in FIG. 4, the protective tube is merely omitted. The skirts of the covering are still stacked and glued one on another. Once the skirts of the covering are glued to the dielectric rod, it has been found that they exert moderate pressure on the dielectric rod, on the filler material, and on the optical fiber cable, and thus that the protective tube is not useful. By omitting the protective tube together with one of the interfaces, so that there is only a single interface between the cable and the rod instead of the two interfaces as in the past: one between the cable and the tube; and the other between the tube and the rod; the reliability of electrical insulation of the electrical insulator is improved without significantly degrading the quality of the protection afforded to the optical fiber cable.

In a second embodiment shown in FIG. 5, which is more advantageous than the first embodiment as described above, the protective tube surrounding the optical fiber cable is omitted and replaced by an intermediate tube situated between the rod and the covering. The covering skirts are still stacked and glued. The quality of the protection afforded to the optical fiber cable is comparable to that in the above-mentioned prior art. Nevertheless, although the number of elements and of interfaces between the elements remain the same, the reliability of the electrical insulation provided by the electrical insulator is improved since the rod is better protected from the external medium by the presence of the intermediate tube which can mitigate possible defective joints between the skirts stacked one on another by insulating the rod better from the external medium. Omitting the protective tube and replacing it by an intermediate tube situated between the covering and the rod improves the reliability of the electrical insulation provided by the electrical insulator while conserving protection of comparable quality for the optical fiber cable.

In a third preferred embodiment shown in FIGS. 1 to 3, much more advantageous than the first and second embodiments, the protective tube is omitted. The covering is a single piece, i.e. the skirts of the covering are integral with one another and the covering is secured to the rod and comes directly into contact therewith. By way of example, the covering is molded onto the rod. With the covering skirts being molded onto the dielectric rod, they exert non-negligible pressure on the dielectric rod during molding, and thus also on the filler material and on the optical fiber cable. The protective tube and the increase in the number of interfaces caused by the presence of said tube are replaced by a slot that is deeper, with the optical fiber cable being situated near the bottom thereof. The optical fiber cable is preferably situated at the bottom of the slot; either it comes directly into contact with the bottom of the slot, or else it is spaced apart from the bottom of the slot by a filler material so as to avoid coming into direct contact with the bottom of the slot. Since it is further from the periphery of the rod on which the pressure of the covering is exerted and since it is separated from said pressure by a greater thickness of filler material that absorbs mechanical stresses at least in part, the optical fiber cable is very well protected in spite of there being no protective tube of the kind used in the above-mentioned prior art. Thus, the quality with which the optical fiber cable is protected is good in spite of the pressure exerted on the rod by the one-piece covering, with this being due to the optical fiber cable being spaced apart from the periphery of the rod and due to the thickness of filler material between the cable and said periphery. The rod is very well protected because of the one-piece aspect of the covering which excludes any possible drawback associated with defective joints between the skirts of the covering. Finally, the number of elements and the number of interfaces between elements is minimized because of the one-piece aspect of the covering and because of the omission of the protective tube from the above-mentioned prior art. This ideal compromise is obtained by combining a plurality of aspects comprising: omitting the protective tube of the above-mentioned prior art, replacing said protective tube by greater separation between the optical fiber cable and the periphery of the rod obtained by using a deeper slot and placing the optical fiber cable near the bottom of the slot, and also by the one-piece nature of the covering which also comes directly into contact with the rod to which it is secured.

The invention provides an electrical insulator comprising: a dielectric rod including at least one slot; an optical fiber cable situated in the slot; a dielectric material filling the slot and holding the cable without stress in the slot; and a dielectric covering surrounding the rod and presenting outwardly-directed projections in the form of skirts; the electrical insulator being characterized in that the cable is flexible; and in that all of the space situated between the rod and the cable is filled with said dielectric filler and holding material.

In the invention, and preferably, the slot is deeper than it is wide, the cable is situated closer to the bottom of the slot than to the opening of the slot, and the covering is a single piece, secured to the rod and directly in contact with the rod.

BRIEF DESCRIPTION OF THE DRAWINGS

The invention will be better understood and other features and advantages will appear on reading the following description and examining the accompanying drawings given as examples and in which:

FIG. 1 is a diagrammatic profile view of a preferred third embodiment of an electrical insulator of the invention;

FIG. 2 is a diagrammatic cross-section view of the electrical insulator shown in FIG. 1;

FIG. 3 is a diagram on a larger scale showing a portion of a longitudinal section view of the electrical insulator shown in FIG. 1;

FIG. 4 is a diagram on a larger scale showing a portion of a first embodiment of an electrical insulator of the invention in longitudinal section;

FIG. 5 is a diagram on a larger scale showing a portion of a second embodiment of an electrical insulator of the invention in longitudinal section; and FIG. 6 is a diagrammatic cross-section view of a preferred embodiment of the cable situated in the slot of the rod of an electrical insulator of the invention.

DETAILED DESCRIPTION OF THE INVENTION

FIG. 1 is a diagrammatic profile view of a preferred, third embodiment of an electrical insulator of the invention. The electrical insulator comprises a dielectric rod 1. The rod 1 is made of glass fiber, for example. The rod 1 is typically cylindrical in shape. The rod 1 includes at least one slot 10 which extends along the entire length of the rod 1. In the slot 10 there is situated an optical fiber cable 2. All of the space situated within the slot 10 between the rod 1 and the cable 2 is filled with a dielectric filler material for filling the slot 10 and for maintaining the cable 2 in the slot 10 without stressing it; said material is described in greater detail with reference to FIG. 2.

A covering 3 surrounds the rod 1. On the outside, the covering 3 presents projections 30 in the form of skirts. The covering 3 is typically made of a composite material, e.g. of silicone or of ethylene propylene diene monomer (EPDM) or any other synthetic material. The covering 3 constitutes a single piece, being molded directly onto the rod 1, for example. The covering 3 is secured to the rod 1, e.g. by vulcanization. There is no intermediate layer of some other material between the rod 1 and the covering 3. The electrical insulator has two ends 5 and 6 surrounding the ends of the rod 1 and coming into abutment against the ends of the covering 3.

The bottom end 6 of the electrical insulator is open, the cable 2 leaving via the central hole in the bottom end 6 for connection to an optical terminal of the underground optical network. The portion of the cable 2 that extends from the electrical insulator via the bottom end 6 is typically several tens of meters (m) long, e.g. 30 m to 40 m. The top end 5 is connected, e.g. via a screw connection at a junction 50 to a box 51 so as to form a cavity 52. Thus, the electrically insulating electrical transition comprises at least two parts that are releasably secured to each other: firstly the electrical insulator comprising in particular the rod 1 and its covering 3; and secondly a box 51 situated at one end of the electrical insulator. The modularity of the electrically insulating transition is made possible by the solid aspect of the rod, unlike certain prior art systems which present electrically insulating transitions where the inside is filled with an electrically insulating liquid. The modularity of the electrically insulating transition is advantageous insofar as it enables stocks to be managed more effectively.

Inside the cavity 52 of the box 51 there is a cassette 4 for storing optical fiber splices connecting the cable 2 to optical fibers 40 that are located in a phase conductor outside the box 51. The excess length of cable 2 wound in the cassette 4 can typically reach several meters, e.g. 5 m. The cable 2 is flexible unlike the rigid protective tube of the above-mentioned prior art, so it can follow gentle bends outside the electrical insulator, in particular to reach the optical connection terminal. The cable 2 is entirely dielectric.

FIG. 2 is a diagrammatic cross-section view of the electrical insulator shown in FIG. 1. The dielectric rod 1 presents at least one slot 10. The rod 1 may present a plurality of slots regularly spaced apart around the periphery of the rod, each slot containing an optical fiber cable, for example it may have two diametrically opposite slots. The slot 10 is of width l and of depth p. The depth p is greater than the width l and is preferably not less than one-and-a-half times the width l, e.g. being about twice the width l. The depth p of the slot 10 is preferably not less than one-and-a-half times the diameter d of the cable 2, and is advantageously greater than twice the diameter d of the cable 2. The depth p of the slot 10 advantageously lies in the range 15 millimeters (mm) to 25 mm, being equal to about 20 mm, for example. The cable 2 is situated in the slot 10 near to the bottom of the slot 10, i.e. closer to the bottom 12 of the slot 10 than to the opening 11 of the slot 10. The cable 2 is at the bottom of the slot 10. In FIG. 2 it is touching the bottom 12 of the slot 10.

All of the space situated between the rod 1 and the cable 2 is filled by a material 8 for filling the slot 10 and for holding the cable 2 in the slot 10 without stressing it. All of the space situated between the rod 1 and the cable 2 is filled, i.e. there is no material other than said material 8 situated between the rod 1 and the cable 2, for example there is no protective tube as in the above-mentioned prior art, nor is there any significant void left in the slot 10. Said material 8 holds the cable 2 in the slot 10, i.e. it prevents it from leaving the slot 10 and it prevents it from moving freely in the slot 10. Said material 8 holds the cable 2 without stressing it, i.e. said material 8 does not exert any mechanical stress on the cable 2 that might significantly degrade optical transmission along the cable 2. Said material 8 is referred to as a "dielectric filler and holding" material 8. The filler and holding material 8 also serves to protect the cable 2 by absorbing the pressure exerted by the covering 3, particularly while the covering 3 is being put into place on the rod 1, e.g. by molding; for this purpose, the filler and holding material 8 needs to be sufficiently soft. The filler and holding material 8 is dielectric so as to be electrically insulating and capable of withstanding high temperatures so as to be capable of performing its function of holding the cable 2 in the slot 10. The filler and holding material 8 is constituted, for example, by a silicone adhesive or paste. Adhesion between the filler and holding material 8 and the rod 1 is preferably at least as strong as the adhesion between the covering 3 and the rod 1, so as to avoid degrading the insulating properties of the electrical insulator.

The covering 3 is a single piece secured to the rod 1 and in direct contact with the rod 1, i.e., specifically, there is no layer of adhesive between the rod 1 and the covering 3 as in the other embodiments. The covering 3 presents outwardly-directed projections 30 in the form of skirts.

FIG. 3 is a diagrammatic longitudinal section view on a larger scale of the electrical insulator shown in FIG. 1. The rod 1 is surrounded by the one-piece covering 3 that presents skirts 30. The covering 3 is in direct contact with the rod 1. The covering 3 is secured to the rod 1. The covering 3 is preferably molded directly onto the rod 1 and is advantageously secured by vulcanization.

In FIGS. 4 and 5, only the differences of the first and second embodiments compared with the third embodiment are shown, the remainder is assumed to be identical or similar, unless mentioned to the contrary.

FIG. 4 is a diagrammatic longitudinal section view of a first embodiment of an electrical insulator of the invention on a scale larger than FIG. 1. The covering 3 is constituted by a stack of skirts 30 that are stuck to one another by an adhesive 32. The skirts are also stuck to the rod 1 by an adhesive 31 which may be identical to the adhesive 32 or different therefrom.

FIG. 5 is a diagrammatic longitudinal section view of a second embodiment of an electrical insulator of the invention, shown on a scale larger than that of FIG. 1. The covering 3 is constituted by a stack of skirts 30 stuck to one another by an adhesive 32. The skirts 30 are also stuck to an intermediate tube 34 by means of an adhesive 33 which is identical to the adhesive 32 or different therefrom. The intermediate tube 34 is in turn stuck to the rod 1 by an adhesive 31 which is identical to the adhesive 32 and 33 or different therefrom. The intermediate tube 34 is situated between the rod 1 and the covering 3 constituted by the skirts 30 stacked and stuck one on another. The intermediate tube 34 and the covering 3 are preferably made of the same material so as to make them easier to stick together.

FIG. 6 is a diagrammatic cross-section view of a preferred embodiment of the cable 2 situated in the slot 10 in the rod 1 of an electrical insulator of the invention. The optical fiber cable 2 is a telecommunications cable which makes the aspect of protecting the cable 2 that much more important. The cable 2 is referred to as a "microcable". The diameter of the optical fiber cable preferably lies in the range 5 mm to 10 mm. The optical fiber cable 2 preferably includes a central reinforcing element 21 with tubes 22 containing optical fibers 23 being disposed around the reinforcing element, the tubes 22 in turn being surrounded by an outer sheath 26.

More precisely, and by way of example, the cable 2 contains 72 optical fibers in all and presents a diameter d of about 8 mm. The cable 2 includes a central reinforcing element 21 which is surrounded by six tubes 22 of polyamide each containing twelve optical fibers 23 and each filled with a thixotropic gel 24. The gaps between the tubes 22 are filled with a material 25 providing protection against moisture, said material presenting very high viscosity. An outer sheath 26 of polyamide surrounds the set of tubes 22. A layer 27 of binder lines the inside of the outer sheath 26, which binder is made of porous material so as to allow the material 25 to polymerize.

What is claimed is:

1. An electrical insulator comprising:
    a dielectric rod (1) including at least one slot (10);
    an optical fiber cable (2) situated in the slot (10);
    a dielectric material (8) filling the slot (10) and holding the cable (2) without stress in the slot (10), said dielectric material contacting said optical fiber cable and an inside surface of said slot; and
    a dielectric covering (3) surrounding the rod (1) and presenting outwardly-directed projections (30) in the form of skirts;
    the electrical insulator being characterized in that the cable (2) is flexible; and
    in that all of the space situated between the rod (1) and the cable (2) is filled with said dielectric filler and holding material (8).

2. The electrical insulator according to claim 1, wherein the slot (10) is deeper than it is wide;
    in that the cable (2) is situated closer to the bottom (12) of the slot (10) than to the opening (11) of the slot (10); and
    in that the covering (3) is a single piece secured to the rod (1) and directly in contact with the rod (1).

3. The electrical insulator according to claim 2, wherein the depth (p) of the slot (10) lies in the range 15 mm to 25 mm.

4. The electrical insulator according to claim 1, wherein the covering (3) comprises a plurality of skirts (30) stacked one on another.

5. The electrical insulator according to claim 4, wherein the electrical insulator also includes an intermediate tube (34) situated between the rod (1) and the covering (3).

6. The electrical insulator according to claim 5, wherein the intermediate tube (34) and the covering (3) are made of the same material.

7. The electrical insulator according to claim 1, wherein the rod (1) includes a plurality of slots (10) regularly spaced apart around its periphery.

8. The electrical insulator according to claim 1, wherein the rod (1) is made of fiberglass.

9. The electrical insulator according to claim 1, wherein the filler and holding material (8) is a silicone paste that withstands high temperatures.

10. The electrical insulator according to claim 1, wherein the optical fiber cable (2) is a telecommunications cable.

11. The electrical insulator according to claim 1, wherein the diameter (d) of the optical fiber cable (2) lies in the range 5 mm to 10 mm.

12. The electrical insulator according to claim 1, wherein the optical fiber cable (2) comprises a central reinforcing element (21) having tubes (22) disposed thereabout, said tubes (22) containing said optical fibers (23), and themselves being surrounded by an outer sheath (26).

13. An electrically insulating transition comprising an electrical insulator according to claim 1, the electrically insulating transition being characterized in that it comprises at least two parts that are releasably connected together, namely the electrical insulator and a box (51) situated at one end (5) of the electrical insulator.

14. The electrically insulating transition according to claim 13, wherein the box (51) contains a cassette (4) for storing optical fiber splices.

15. A system comprising at least one optical phase conductor (7) connected to an electrically insulating transition comprising an electrical insulator according to claim 1.

* * * * *